US009623781B2

(12) United States Patent
Denton

(10) Patent No.: US 9,623,781 B2
(45) Date of Patent: Apr. 18, 2017

(54) APPARATUS AND METHOD FOR LOADING AND UNLOADING OBJECTS UPON AND FROM A VEHICLE

(71) Applicant: Bradley Denton, Channahon, IL (US)

(72) Inventor: Bradley Denton, Channahon, IL (US)

( * ) Notice: Subject to any disclaimer, the term of this patent is extended or adjusted under 35 U.S.C. 154(b) by 29 days.

(21) Appl. No.: 14/670,497

(22) Filed: Mar. 27, 2015

(65) Prior Publication Data
US 2016/0280116 A1   Sep. 29, 2016

(51) Int. Cl.
B60P 1/44 (2006.01)
(52) U.S. Cl.
CPC ................. B60P 1/4428 (2013.01)
(58) Field of Classification Search
CPC ....... B60P 1/4428; B60P 1/003; B60P 1/4492; B60P 1/445; B60P 1/4421; B60P 1/44; B60P 1/4414; B66F 9/10; B66F 9/122; B66F 9/146; B66F 9/142
USPC ....... 414/544, 545, 556, 557, 667, 785, 664, 414/668, 671, 629, 631, 663
See application file for complete search history.

(56) References Cited

U.S. PATENT DOCUMENTS

| 2,668,602 | A | * | 2/1954 | Cusbman | B66F 9/12 414/667 |
| 3,226,086 | A | * | 12/1965 | Lavieri | B60P 1/4414 254/124 |
| 3,235,105 | A | * | 2/1966 | Loomis | B66F 9/10 414/544 |
| 3,779,406 | A | * | 12/1973 | Hermann | B60P 1/4414 414/537 |
| 3,851,779 | A | * | 12/1974 | Crawford | B66F 9/12 414/667 |
| 6,575,516 | B2 | * | 6/2003 | Webber | B60P 1/43 14/69.5 |
| 6,682,114 | B1 | * | 1/2004 | Cox | B60P 1/4492 296/26.08 |
| 7,232,285 | B1 | * | 6/2007 | Ruch | B60P 1/4421 254/10 R |
| 2013/0189065 | A1 | * | 7/2013 | Zoppi | B66F 9/141 414/671 |
| 2016/0107559 | A1 | * | 4/2016 | Russo | B60P 1/4485 414/540 |

* cited by examiner

Primary Examiner — Michael McCullough
Assistant Examiner — Mark Hageman
(74) Attorney, Agent, or Firm — Donald Flaynik

(57) ABSTRACT

A truck gate for elevating objects to be manually urged from the truck gate onto a bed portion of a truck includes a pivoting base portion attached to truck gate lifting means (not depicted) for elevating the base portion from ground level to an elevated position that disposes the base portion into horizontal alignment with a bed of a truck. The truck gate further includes a plurality of gate fingers secured to the pivoting base portion such that a maximum number of objects can be disposed upon the gate fingers at ground level then elevated to a substantially horizontal position adjacent to and aligned with the bed of the truck.

6 Claims, 12 Drawing Sheets

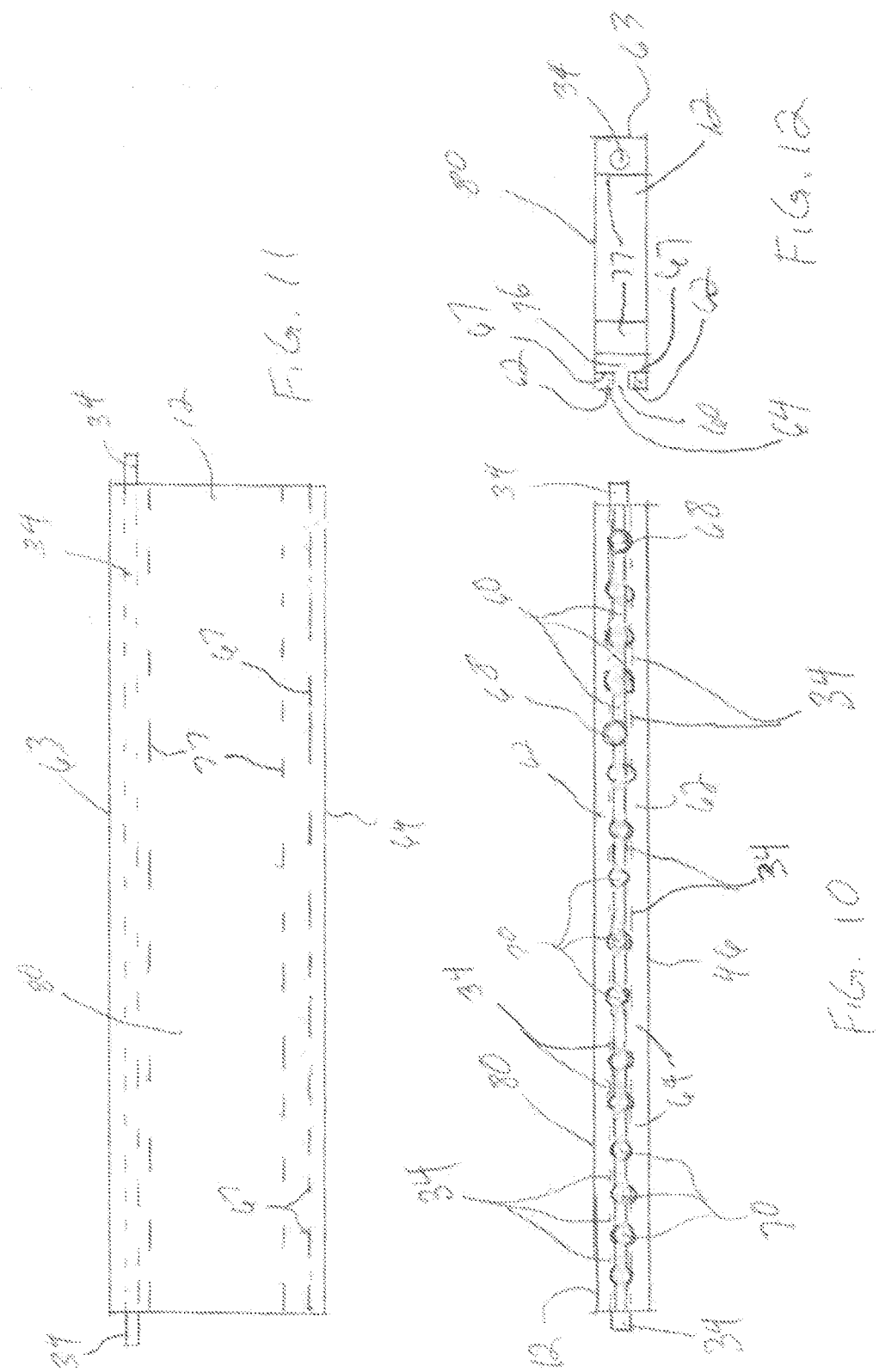

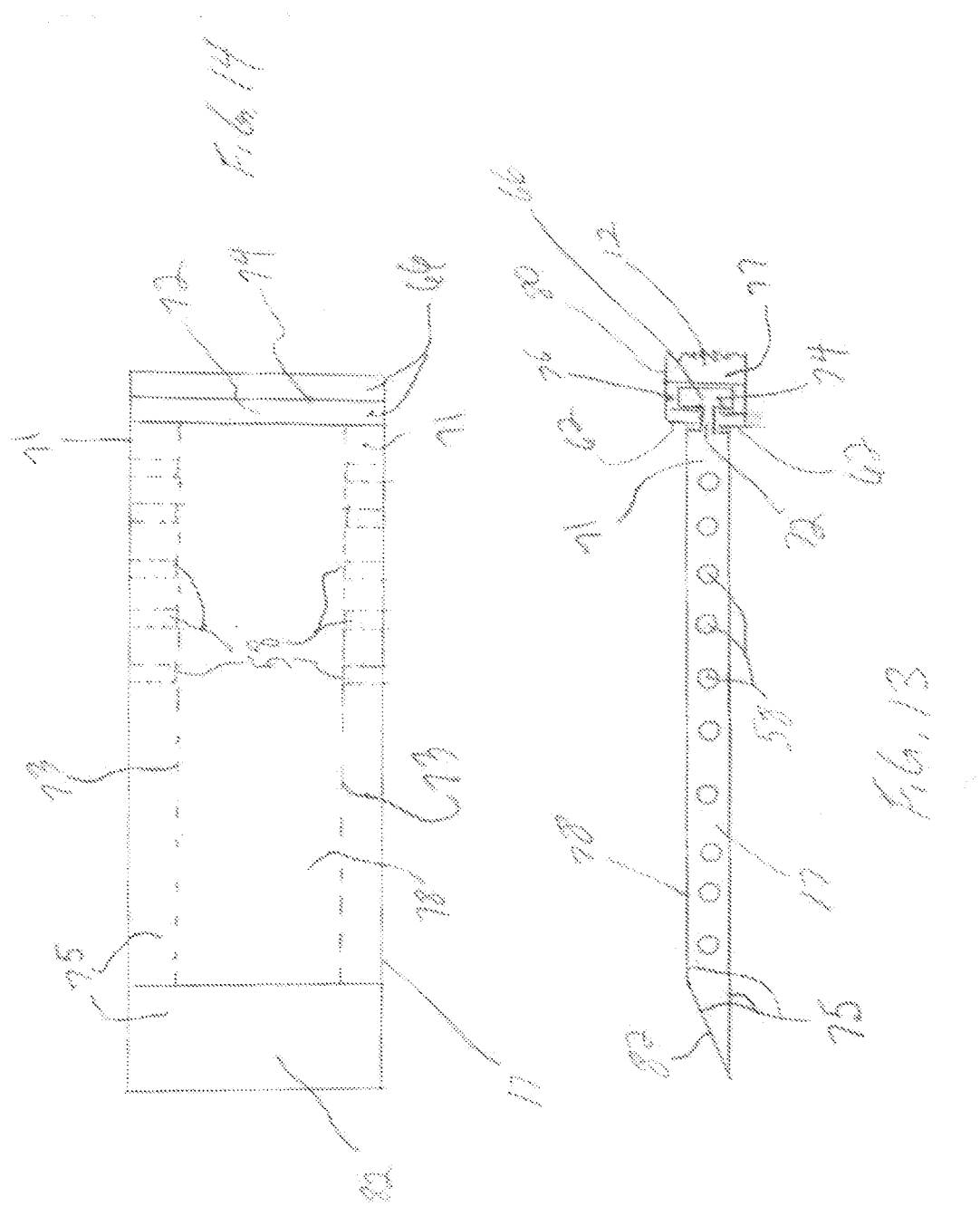

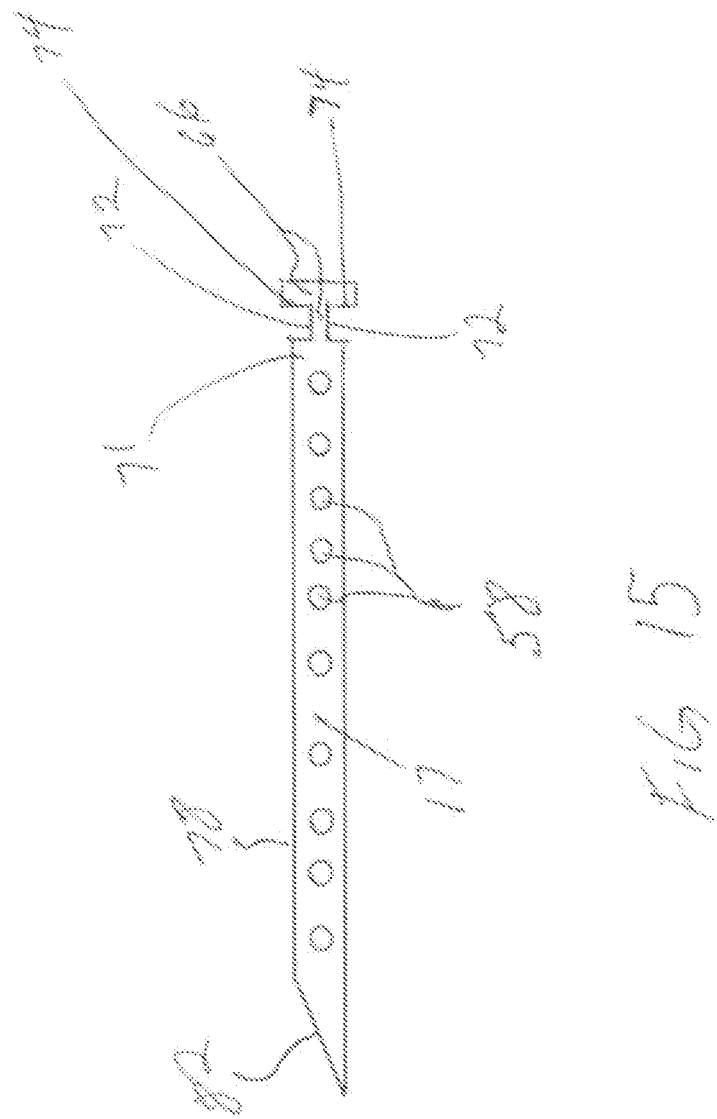

APPARATUS AND METHOD FOR LOADING AND UNLOADING OBJECTS UPON AND FROM A VEHICLE

BACKGROUND OF THE INVENTION

1. Field of the Invention

This invention relates to an apparatus and method for loading and unloading objects upon and from a vehicle, and more particularly, to a truck gate that includes gate fingers attached a base portion to form recesses that allows a person to step between adjacent gate fingers to enable the person to slide an object from a truck "bed" and upon cooperating gate fingers when the vehicle gate is elevated and horizontally positioned in substantial alignment with the truck bed, whereupon, the truck loading gate and objects thereupon are lowered to the ground level, then the objects are manually slid from the loading gate and disposed upon the ground.

2. Background of the Prior Art

Lift gates and in particular, hydraulic lift gates are well known and have a myriad of uses, the most common being for loading and unloading any type of object (so long as the object can be supported by only the gate) upon or from a truck hauling surface or truck "bed" to ultimately deliver the objects to a predetermined destination. The operation of a prior art truck gate requires the lowering of a truck gate from a substantially vertical position to a substantially horizontal position that places the truck gate in planar alignment with the truck bed. A person then manually slides an object from the truck bed and upon the lowered truck gate, and lowers the gate until the objects are sufficiently close to ground level to slide or lift the objects from the lowered gate and upon the ground. When elevating objects from ground level to the truck bed, objects are manually disposed upon a lowered truck gate, then elevated until the truck gate is aligned planar with the truck bed, whereupon, the objects are manually slid from the gate onto the truck bed.

A problem with the prior art method and apparatus (truck gate) for lowering relatively "tall" objects disposed on the truck to ground level is that a person has to stand on the ground and manually hold the objects upon the horizontal truck gate so that the objects do not tip or otherwise fall from the lowering truck gate. Manually maintaining the tall objects upon the gate can be difficult because the person holding the object has to avoid the lowering gate, while at the same time trying to maintain the object vertical by extending his or her arms over a lowering edge of the gate and placing his or her hands upon a surface area of the object adjacent to the lowering edge, resulting in a potentially dangerous position for the person.

SUMMARY OF THE INVENTION

It is an object of the present invention to overcome many of the disadvantages associated with prior art truck gates that lower and raise objects from and upon a truck bed. A principal object of the present invention is to provide a truck gate having multiple gate fingers perpendicularly extending from a base portion that is disposed proximate to an edge portion of the truck bed. A feature of the truck gate is at least one recess provided between separated fingers. An advantage of the truck gate is that the recess is dimensioned to allow a person to stand between separated fingers and closer to the truck bed to allow the person to better grasp and/or maintain the position of the object upon the fingers of the gate, while the gate is lowered or elevated for purposes of unloading objects from or loading objects upon the truck bed with the gate in a substantially horizontal position.

Another object of the present invention is to manually increase the longitudinal dimension of a gate finger to stabilize the lowering or elevating of an object when a dimension of the object is greater than the corresponding longitudinal dimension of a gate finger supporting the object. A feature of the truck gate is an extension finger that is slidably secured to a gate finger to allow the total length of the combined extension and gate fingers to engage a corresponding lower wall of the object such that the combined finger length extends beyond a sidewall of the object, there exposing an end portion of the extension finger. An advantage of the truck gate is that the extension finger reduces the amount of manual force required to maintain the object in a substantially vertical position when lowering or elevating the truck gate.

Yet another object of the present invention is to slidably secure the gate fingers at predetermined positions selected by the user of the truck gate. A feature of the truck gate is a groove in the base portion with retaining walls in a longitudinal front edge portion of the base portion that slidably captures a retaining portion of the gate finger. An advantage of the truck gate is that the retaining portion of the gate finger allows the gate finger to slide within the groove parallel to the edge of the truck bed while maintaining the longitudinal dimension of the gate finger perpendicular to the edge of the truck bed. Another advantage of the truck gate is that the slidable gate fingers can be locked in a predetermined position in the groove in the base portion by a threaded restraining bolt rotationally inserted through one of a plurality of threaded apertures in the edge portion of the base portion, thereby preventing the user of the truck gate from being injured when standing between adjacent gate fingers that could slide and forcibly strike the user if the position of the gate fingers were not properly secured.

Briefly, the invention provides a method for loading and unloading objects onto and from a vehicle, the method includes the steps of:

measuring lateral and longitudinal side wall edges of a bottom wall of each of the objects;

determining the maximum number of objects that can be disposed upon a gate attached to the vehicle when the measured objects are disposed upon the gate such that said lateral and longitudinal edges of each measured object are linearly aligned and parallel to a back gate edge of the gate that extends parallel to a corresponding edge of a bed portion of the vehicle, and such that the longitudinal edges of each measured object are perpendicular to the back gate edge of the gate;

determining the longitudinal dimension of gate fingers that are detachably secured to a base portion of the gate after the gate base portion is secured to means for elevating and lowering the base portion;

attaching the gate fingers to the base portion of the vehicle gate such that the attached gate fingers cooperate to maximize the number of objects that can be disposed upon and lifted by the vehicle gate to ultimately allow the objects to be positioned upon a bed portion of the vehicle; and separating adjacently disposed gate fingers sufficiently to allow a person to be positioned between respective adjacently disposed gate fingers to allow the person to slide an object upon cooperating gate fingers when the vehicle gate is elevated and horizontally positioned in substantial alignment with the vehicle bed to ultimately allow the objects upon the vehicle gate to be lowered upon the ground.

The invention further provides a truck gate for elevating objects to be manually urged from the truck gate onto a bed portion of a truck comprising:

a pivoting base portion attached to truck gate lifting member for elevating the base portion from ground level to an elevated position that disposes the base portion into horizontal alignment with a bed portion of a truck;

a plurality of gate fingers secured to the pivoting base portion such that a maximum number of objects can be disposed upon the gate fingers at ground level then elevated to a substantially horizontal position adjacent to and aligned with the bed portion of the truck. The gate fingers form recesses for a person to enter thereby allowing the person to forcibly urge the objects from the gate fingers onto the truck bed; and members for pivoting the base portion after the objects have been manually urged from the gate fingers and onto the truck bed to dispose the plurality of gate fingers in a substantially vertical position to maintain the objects upon the truck bed while the truck is in transit.

The invention also provides a system for elevating objects to a storage area that includes but is not limited to means for elevating a base member to a predetermined elevation; means for securing a plurality of fingers to said base member; and means for allowing a user to stand between adjacent fingers secured to said base member to allow the user to stand adjacent to an edge portion of said base portion, whereby the user is able to remove the objects from said plurality of fingers and said base portion and position the objects upon an adjacent surface.

BRIEF DESCRIPTION OF THE DRAWINGS

The foregoing invention and its advantages may be readily appreciated from the following detailed description of the preferred embodiment, when read in conjunction with the accompanying drawings in which:

FIG. 10 is a front elevation view of a pivoting base portion of the truck gate without any gate fingers attached thereto in accordance with the present invention.

FIG. 11 is a top elevation view of the pivoting base portion of FIG. 10.

FIG. 12 is a side elevation view of the pivoting base portion of FIG. 10.

FIG. 13 is a side elevation view of a gate finger slidable secured to a cutaway portion of the side elevation view of the pivoting base portion of FIG. 12.

FIG. 14 is a top elevation view of the gate finger of FIG. 13, but without the gate finger being attached to the pivoting base portion.

FIG. 15 is the side elevation view of the gate finger of FIG. 13, but without the gate finger being attached to the pivoting base portion.

DESCRIPTION OF THE PREFERRED EMBODIMENT

Figure 1:
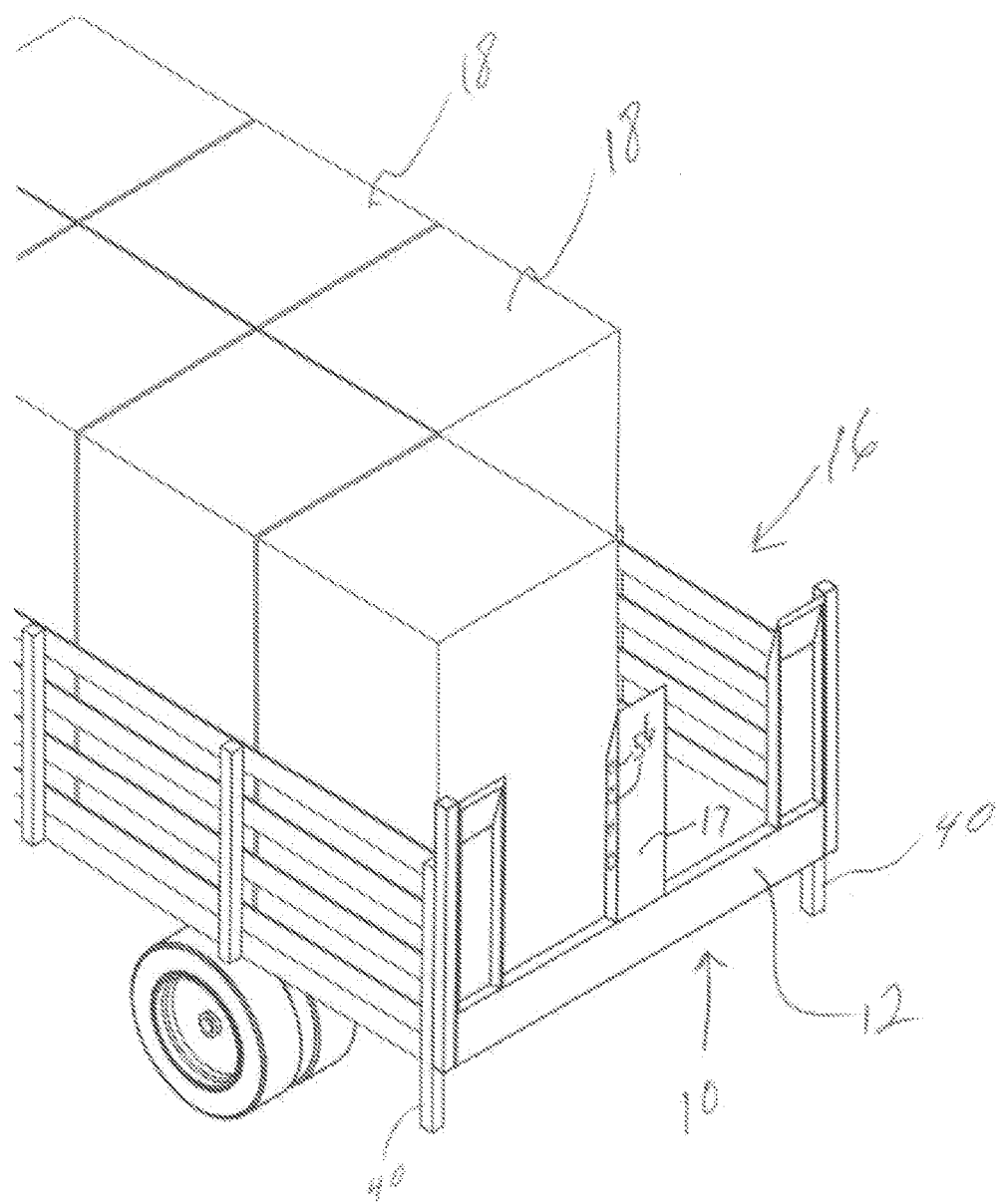
FIG. 1 is a perspective view of a truck gate in a vertical position and secured to truck channels in accordance with the present invention.

Referring now to the figures, a truck gate for elevating objects to be manually urged from the truck gate onto a bed portion of a truck is denoted as numeral 10. The truck gate 10 includes a pivoting base portion 12 attached to truck gate lifting means (not depicted) for elevating said base portion 12 from ground level to an elevated position that disposes said base portion 12 into horizontal alignment with a bed 14 of a truck 16. The truck gate 10 further includes a plurality of gate fingers 17 secured to the pivoting base portion 12 such that a maximum number of objects 18 can be disposed upon the gate fingers 17 at ground level then elevated to a substantially horizontal position adjacent to and aligned with the bed 14 of the truck 16.

The gate fingers 17 are fabricated from two and one-quarter inch steel support channels 73 with steel diamond plating 75 welded to and covering the channels 73. The gate fingers 17 form recesses 20 for a person (not depicted) to step between adjacent fingers 17, thereby allowing the person to forcibly urge the objects 18 from the gate fingers 17 onto the truck bed 14 with relative ease, while guiding the object 18 onto the bed portion 14 in a line substantially perpendicular to an edge portion 24 of the truck bed 14. The recesses 20 allow the person to stand adjacent to the edge portion 24 and to simultaneously push and guide a first object 30 via his or her hands simultaneously engaging adjacent side walls 26 and 28 of the first object 30, while urging the first object 30 onto the truck bed 14 such that the object 30 is orientated to allow a second object 32 to be laterally disposed relative to the first object 30 without the second object 32 engaging the first object 30.

The truck gate 10 also includes pivot rods 34 or similar means longitudinally extending through the base portion 12 and vertical truck channels 40 for promoting the pivoting of the base portion 12 from a substantially horizontal position to a vertical position that maintains the object 18 upon the truck bed 14 while the truck 16 is in transit. The pivoting base portion 12 and gate fingers 17 cooperate to allow the loading or unloading of the objects 18 from the truck bed 14 when the base portion 12 and gate fingers are positioned substantially planar with the truck bed 14. Although three gate fingers 17 are depicted in the figures, two, four or more gate fingers 17 can be secured to the base portion 12 when required for an object 18 to be loaded or unloaded upon the truck bed 14.

Methods for raising and lowering the base portion 12 are well known to those of ordinary skill in the art. The figures depict chain supports 36 secured to slide channels 38 that are slidably secured to the vertical truck channels 40. The slide and truck channels 38 and 40 cooperate with a winch (not depicted) for raising and lower the outer fingers 42 and 44 to allow objects 18 to be loaded or unloaded upon the truck bed 14. The preferred method for raising and lower the truck gate 10 after being disposed in a substantially horizontal position is to secure a hydraulic gate lifting member (not depicted but well known to those of ordinary skill in the art) to a lower portion 46 of the base portion 12 or a lower portion 48 of a center finger 50, or securing the hydraulic gate lifting member to both lower portions 46 and 48. A preferred hydraulic pump lift gate is manufactured by Anthony Lift Gate Parts located at a myriad of Anthony Lift Gate Dealers in the Chicago, Ill. area. A spring loaded Anthony Lift gate with a locking bolt is used for the pivoting base portion 12. The pivoting base portion 12 includes two and one-quarter inch steel support channels 77 and steel diamond plating for constructing the pivoting base portion 12. After all objects 18 have been removed from the truck gate 10, the spring loaded gate design allows the truck gate 10 to be manually lifted from a horizontal to a vertical position by the user urging the truck gate 10 in a upward in a substantially vertical direction with one hand until the truck gate 10 can be secured to vertical truck channels 40.

The gate fingers 17 of the truck gate 10 can be integrally secured to the base portion 12 by welding or similar securing means. Alternatively, the gate fingers 17 can be slidably secured to the base portion 12 to allow the gate fingers 17 to be manually disposed and secured to predetermined portions of the base portion 12 that correspond to respective bottom wall dimensions of the objects 18 to promote the stable positioning of objects 18 upon the fingers 17 when the gate is lowered to a horizontal position. Referring to FIGS. 10-12, the gate fingers 17 are slidably secured to the base portion 12 via a groove 60 with retaining walls 62 in a longitudinal front edge portion 64 of said base portion 12 that slidably captures a retaining portion 66 of the gate finger 17, thereby allowing the retaining portion 66 to longitudinally slide within the groove 60 until being locked at a predetermined position via two threaded restraining bolt 68 disposed adjacent to a side wall 71 of a respective gate finger 17. The two bolts 68 are then rotationally inserted through a respective one aperture 70 of a plurality of threaded apertures 70 in the edge portion 64 of the base portion 12. Irrespective of the gate fingers 17 being welded or slidably secured to the base portion 12, a stabilizing crossbar 19 can be removably secured through each of the gate fingers by inserting the stabilizing crossbar 19 through orifices in each of the gate fingers 17 using locking nuts to secured the position of the stabilizing crossbar 19 relative to the gate fingers 17, thereby increasing the stability of the joined gate fingers 17 when relatively heavy objects 18 are disposed upon the horizontally positioned gate fingers 17.

Referring to FIGS. 13 and 14, the retaining portion 66 of the gate fingers 17 includes a groove portion 72 and a wall engagement portion 74. The groove portion 72 inserts between the retaining walls 62 and the retaining portion 66 inserts behind the retaining walls 62 via a sidewall aperture 76 in the base portion 12 until the finger 17 is slid to a predetermined position relative to the base portion 12. After the finger 17 is slid to the desired position, the engagement portion 74 engages back sides 67 of the retaining walls 62 and cooperates with the lateral dimensions of the groove portion 72 and retaining walls 62 such that a top wall 78 of the finger 17 is maintained substantially planar with a top wall 80 of the base portion 12, irrespective of the orientation of the truck gate 10 relative to the truck bed 14.

One or more of the gate fingers 17 of the truck gate 10 can be manually extended to predetermined lengths to support the objects 18 when any of the objects 18 have bottom wall 22 dimensions that exceed the non-extended longitudinal dimension of the gate fingers 17, thereby promoting the stabilized support of the objects upon respective fingers 17 as the objects are raised up to or lowered down from the truck bed 14. Predetermined gate fingers 17 can be extended by slidably disposing an extension finger member 52 upon a selected finger 17, then securing the extension finger 52 upon any one of the fingers 17 (the center finger 50 is depicted with the extension finger 52 secured thereto) via finger bolts 54 inserted through a selected one of multiple recesses 56 in the extension finger 52 aligned with one of several recesses 58 in the gate fingers 17 (see center finger 50). The gate fingers 17 and extension fingers 52 include an inclined end portion 82 that facilitates the sliding of the objects 18 upon or off the gate fingers 17 and/or extension fingers 52. Mechanical stops (not depicted) well known to those of ordinary skill are included to maintain the extension fingers 52 upon the gate fingers 17 when the extension fingers 52 have been extended to a maximum position.

In operation, objects are loaded and unloaded from a truck bed 14 by determining the dimensions of lateral and longitudinal sidewall edges 26 and 28 of a bottom wall 22 of each of the objects 18. After procuring the dimensions, the user of the invention determines the maximum number of objects 18 that can be disposed upon a gate 10 attached to a truck 16 when the measured objects 18 are disposed upon the gate 10 such that the corresponding lateral edges 26 of each measured object 18 are linearly aligned and parallel to a back gate edge 63 of the gate 10 that extends parallel and adjacent to a corresponding edge 24 of a bed portion 14 of the truck 16; and such that the longitudinal edges 28 of each measured object 18 are perpendicular to the back gate edge 63 of the gate 10.

After determining the maximum number of objects 18 that can be disposed upon the gate 10, the user then determines the longitudinal dimension of gate fingers 17 that are integrally or detachably secured to the base portion 12 of the gate 10 after the gate base portion 12 is secured to elements for elevating and lowering the base portion 12.

The user then attaches gate fingers 17 to the base portion 12 of the truck gate 10 such that the attached gate fingers 17 cooperate to maximize the number of objects 18 that can be disposed upon and lifted by the gate 10 to ultimately allow the objects 18 to be positioned upon a bed portion 14 of the truck 16.

Before the user integrally attaches gate fingers 17 to the base portion 12, or after the user slides detachable gate fingers 17 to the base portion, the fingers 17 must be adjacently separated sufficiently to allow a person to be positioned between respective adjacently disposed gate fingers 17 to allow the person to slide an object 18 upon cooperating gate fingers 17 when the gate 10 is elevated and positioned in substantial horizontal alignment with the truck bed 14 to ultimately allow the objects 18 disposed upon the gate 10 to be lowered to ground level, the manually slid or otherwise urged off the gate 10.

Figure 2:
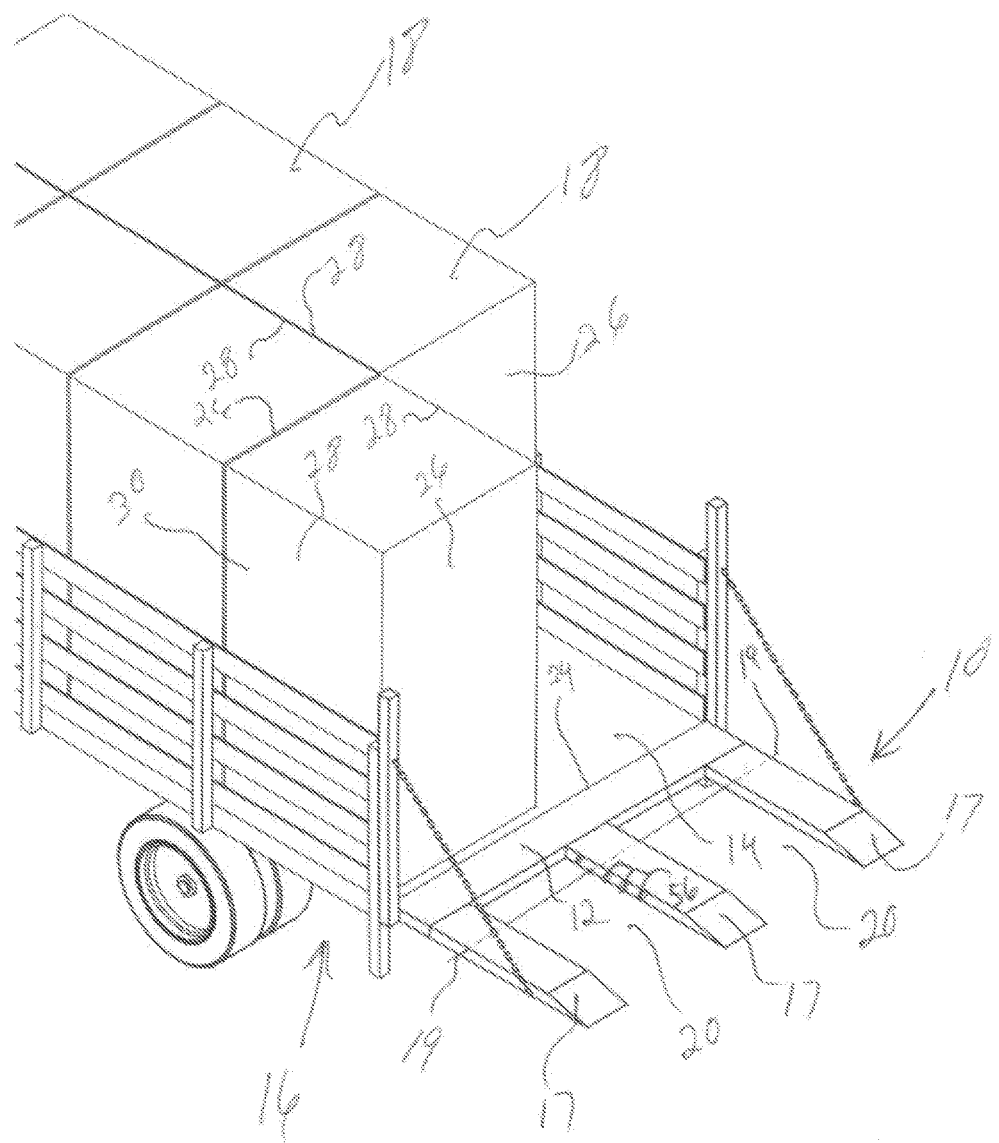
FIG. 2 is the perspective view of FIG. 1, but with the truck gate secured in a horizontal position in accordance with the present invention.
Figure 3:
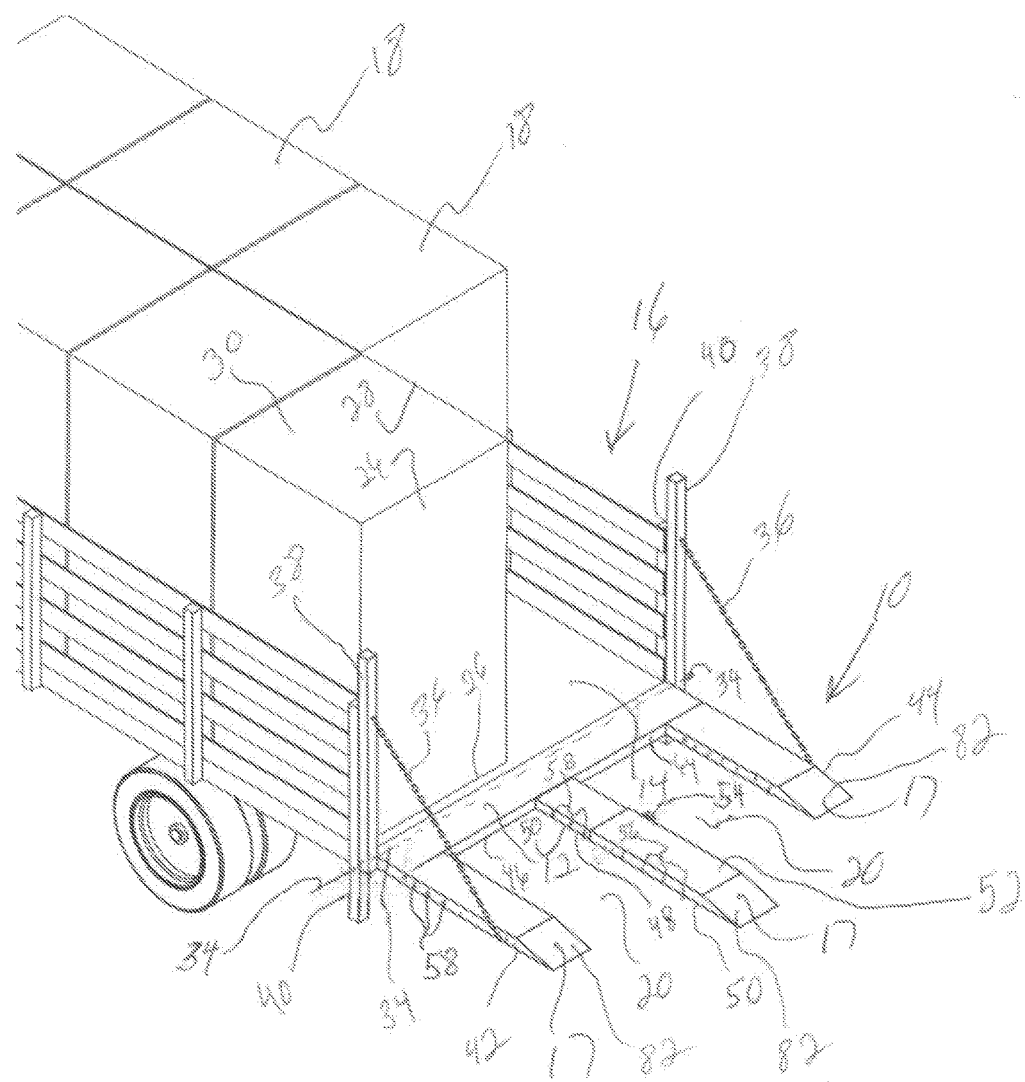
FIG. 3 is the perspective view of FIG. 2, but with the truck gate having a middle gate finger with an extension finger slidably secured thereto in accordance with the present invention.
Figure 4:
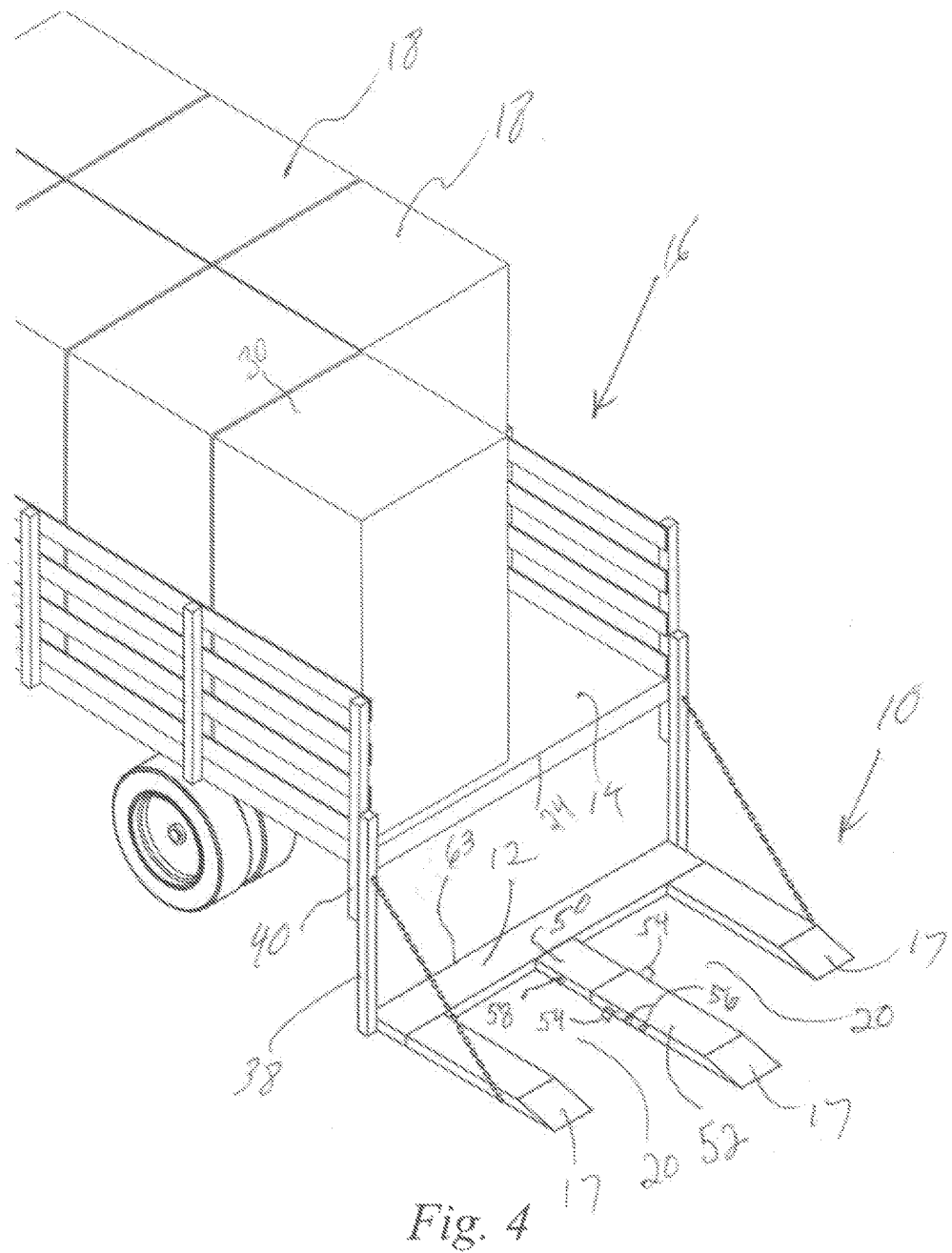
FIG. 4 is the perspective view of FIG. 3, but with the truck gate lowered to ground level in accordance with the present invention.
Figure 5:
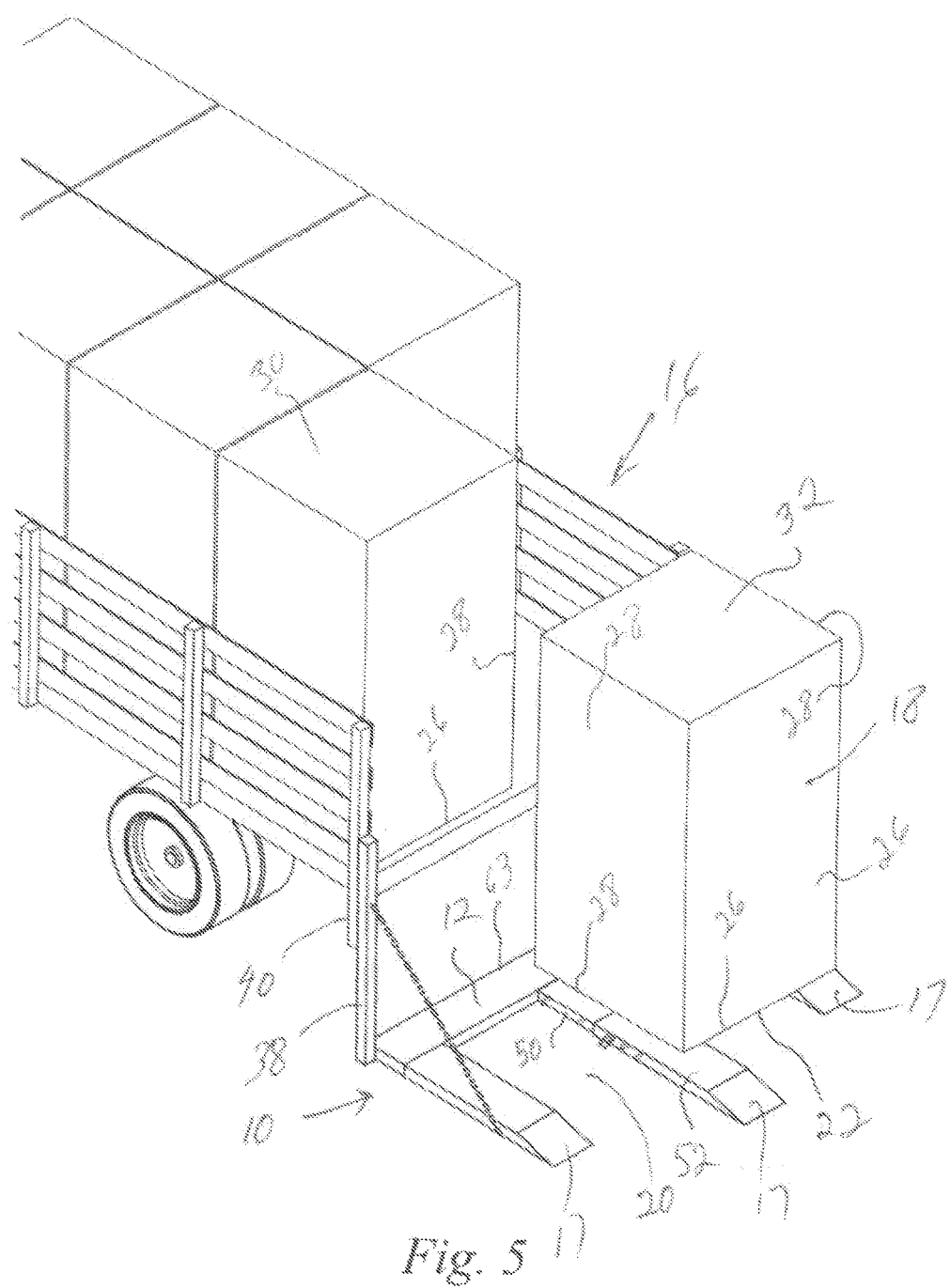
FIG. 5 is the perspective view of FIG. 4, but with an object disposed upon two adjacent gate fingers in accordance with the present invention.
Figure 6:
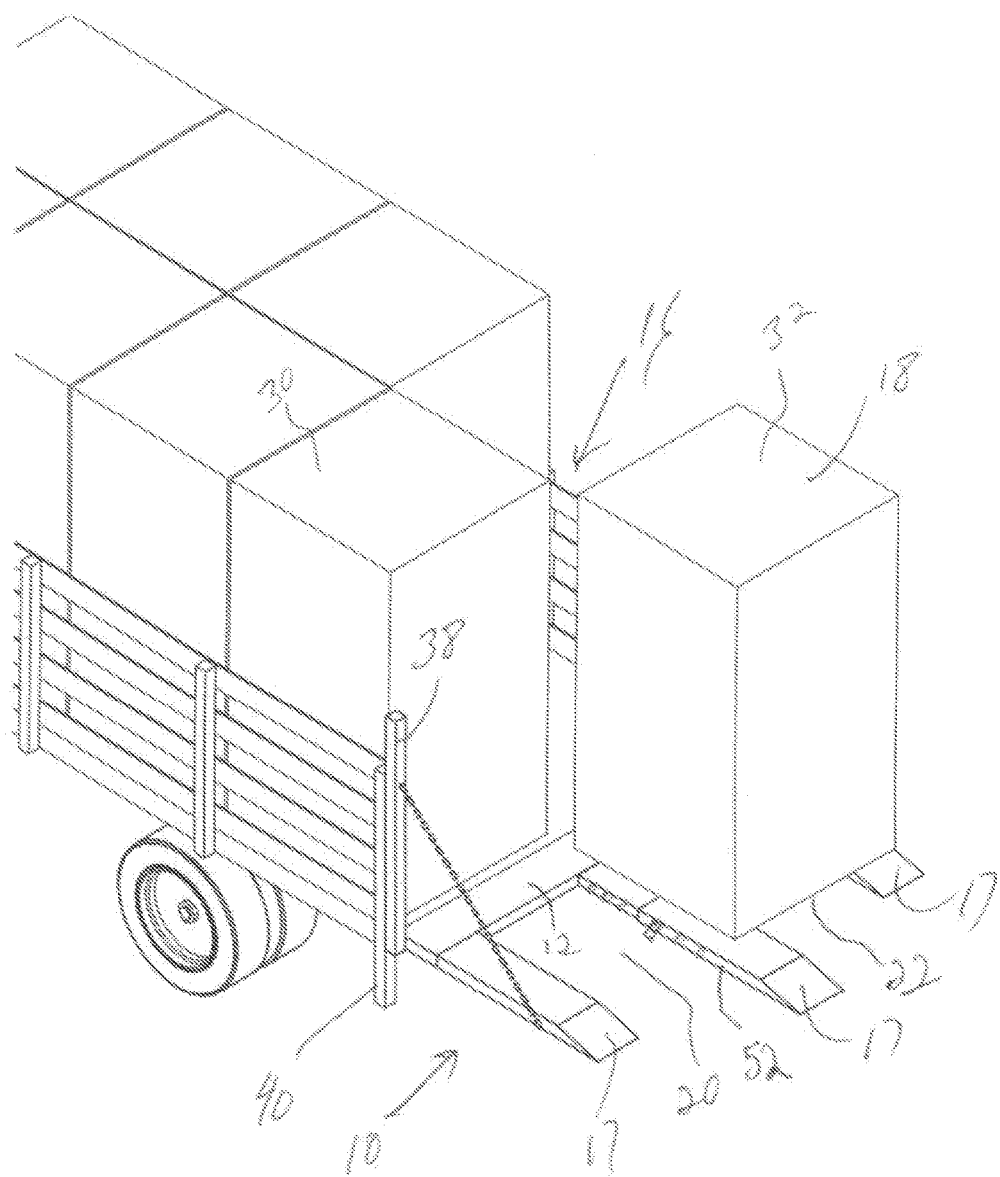
FIG. 6 is the perspective view of FIG. 5, but with the object elevated to a horizontal planar position with the truck bed in accordance with the present invention.
Figure 7:
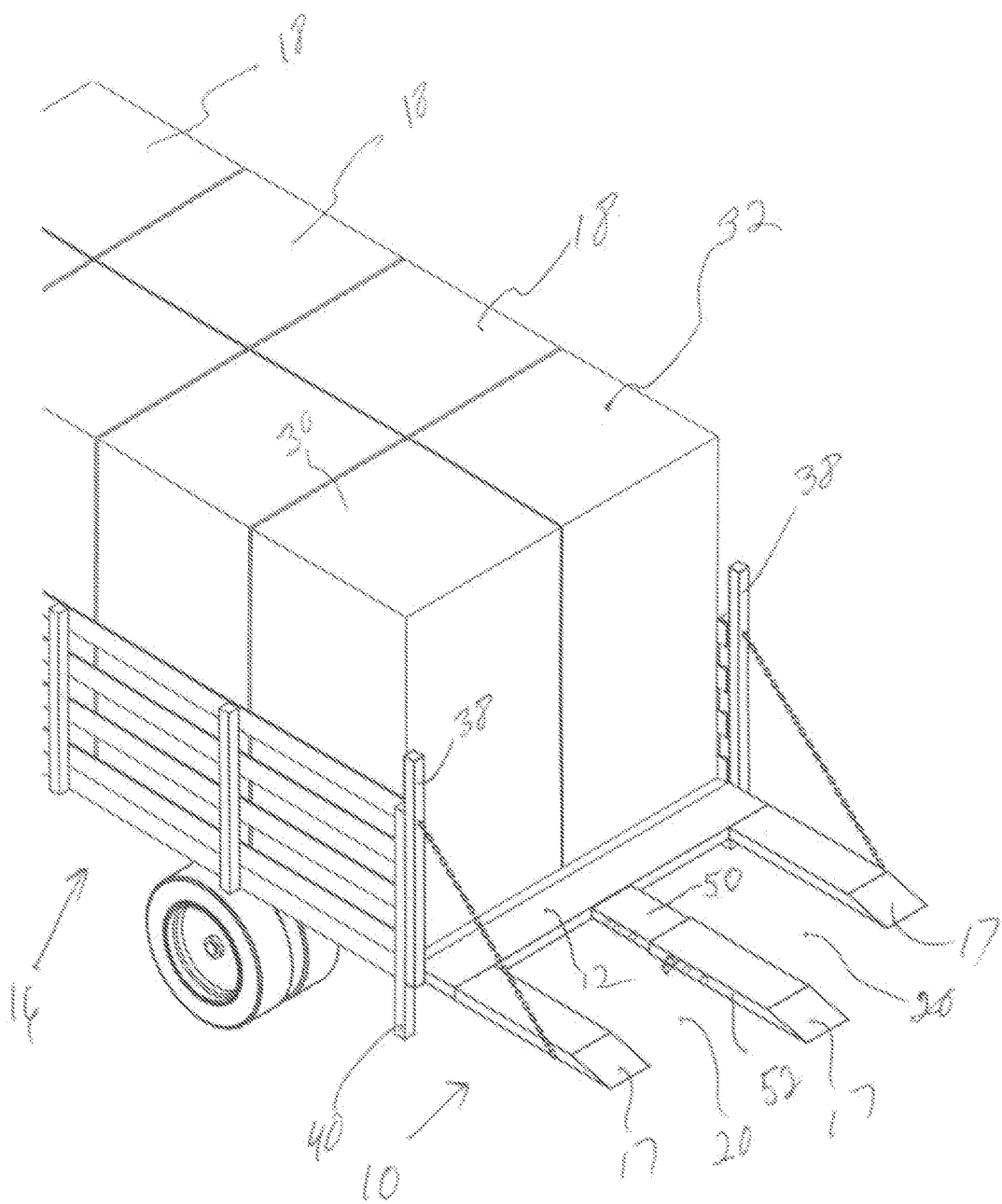
FIG. 7 is the perspective view of FIG. 6, but with the object positioned upon the remaining space on the truck bed in accordance with the present invention.
Figure 8:
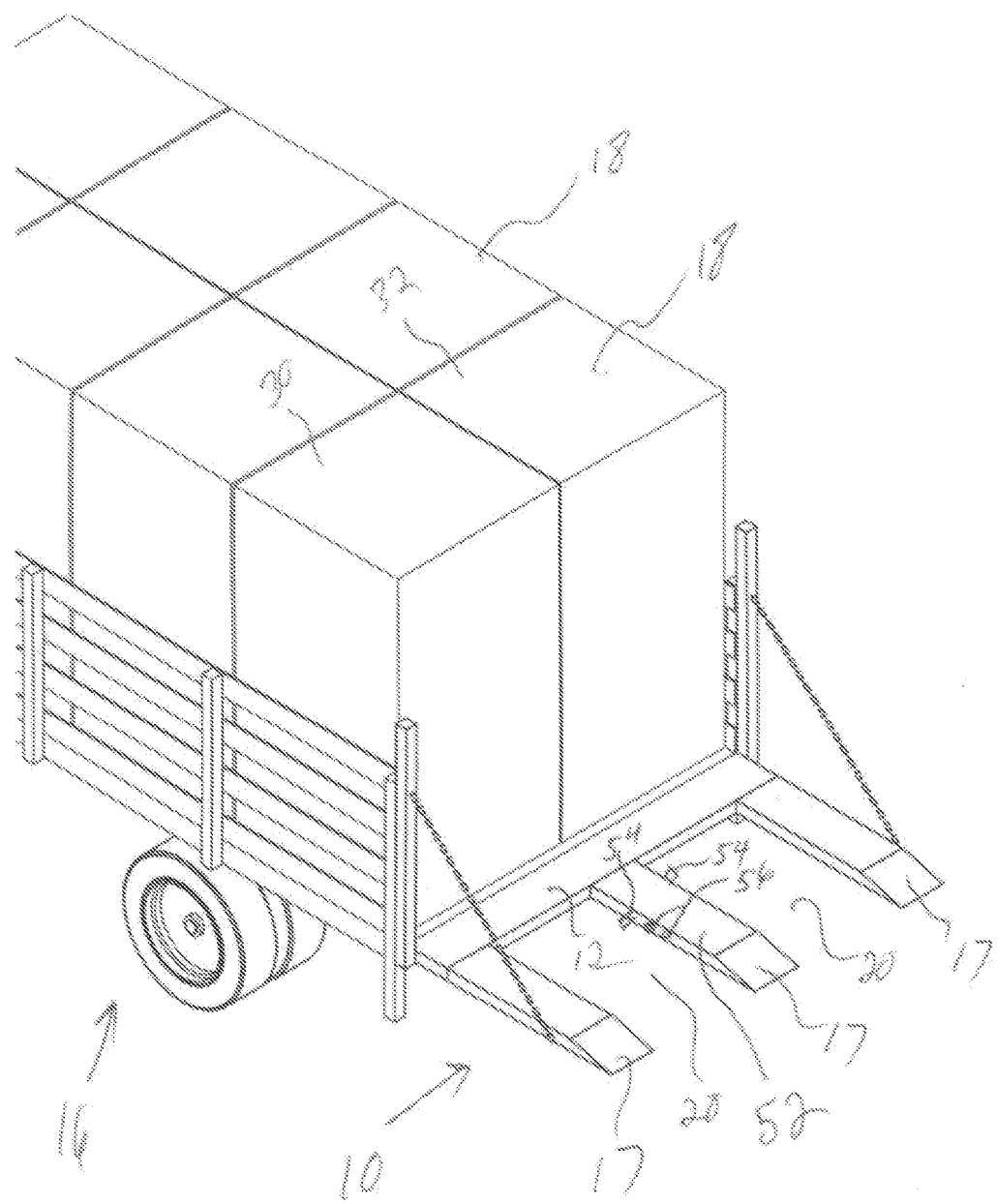
FIG. 8 is the perspective view of FIG. 7, but with the extension finger re-positioned to its original position in accordance with the present invention.
Figure 9:
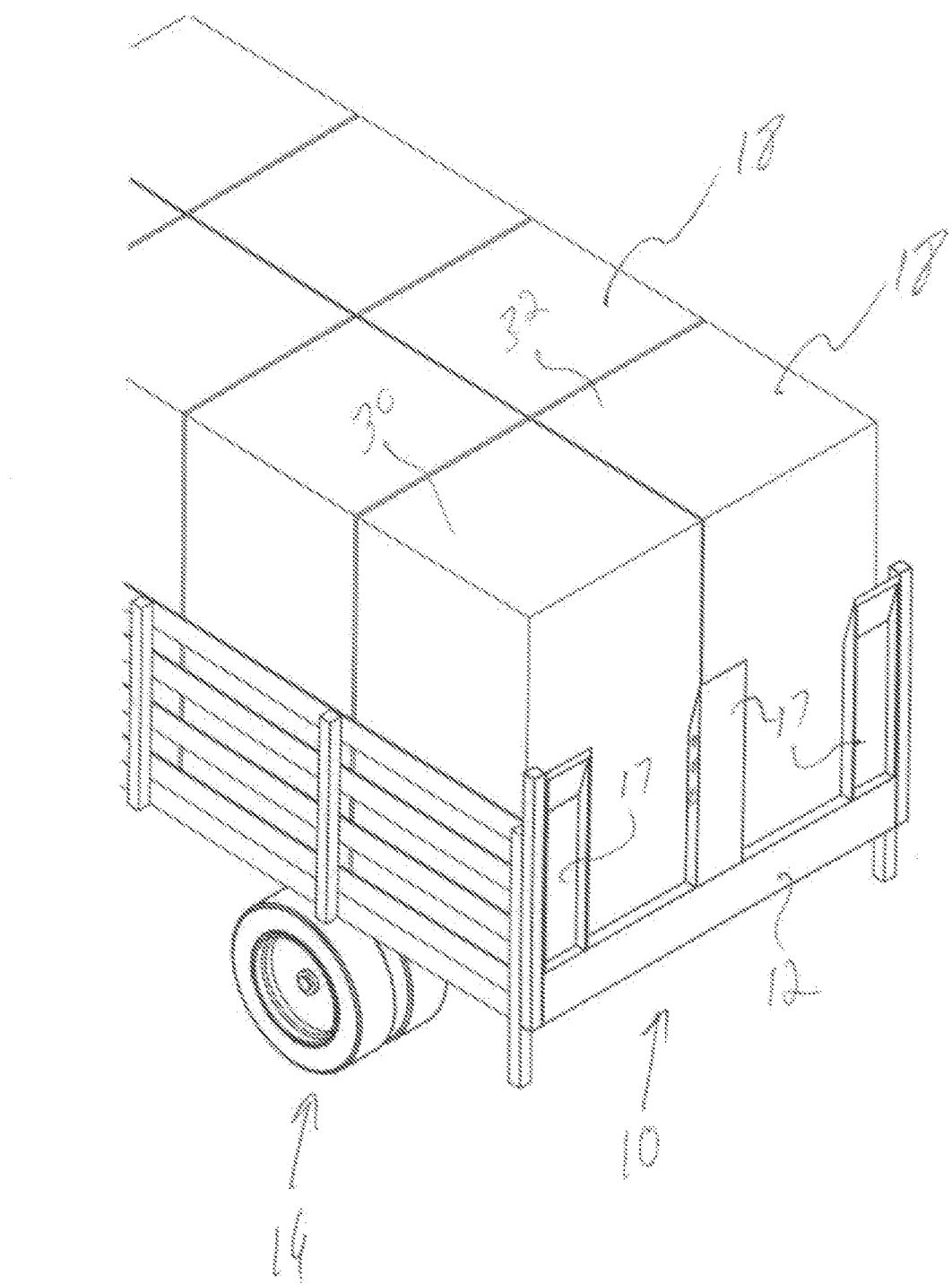
FIG. 9 is the perspective view of FIG. 8, but with the truck gate re-positioned to its original vertical secured position in accordance with the present invention.

After the user has sized and secured gate fingers 17 to the base portion 12, the person or user of the device or gate 10 can transport objects 18 upon a truck with the gate 10 in a vertical or closed position to maintain the objects 18 upon the truck bed 14 (see FIG. 1). Upon reaching his or her destination, the gate 10 is lowered to a position substantially planar with the truck bed 14 (FIG. 2). Upon lower the gate 10, the user has the option of detachably securing finger extensions 52 to one or more gate fingers 17 (see center finger 50 of FIG. 3). The user then lowers the gate 10 to ground level (FIG. 4) and slides a second object 32 upon two adjacent fingers 17, the center finger 50 having a finger extension 52 attached thereto (FIG. 5). The second object 32 is then elevated until the gate 10 is planar with the truck bed 14 (FIG. 6). The second object 32 is then forcibly urged upon the truck bed 14 by the user (not depicted) standing in the recess 20 adjacent to the second object 32, the user ultimately positioning the second object 32 adjacent to a first object 30 (see FIGS. 6 and 7). The user then removes the finger extension 52 from the center gate finger 17 (see FIG. 8), whereupon, the gate 10 is elevated to a substantially vertical position to secure the positions of the objects 18 upon the truck bed 14 to stabilize the positions of the objects 18 during transport.

The invention claimed is:

1. A method for loading and unloading objects onto and from a vehicle, said method comprising the steps of:
   providing a gate for the vehicle, said gate comprising:
      a pivoting base portion attached to gate lifting means for elevating said base portion into planar alignment with a bed portion of the vehicle, and to lower said base portion from planar alignment with the bed portion to a ground level; and
      a plurality of gate fingers secured to said pivoting base portion such that a predetermined number of objects can be disposed upon said gate fingers and lowered from or elevated to the bed portion of the vehicle, said plurality of gate fingers each having a top surface approximately coplanar with a top surface of the pivoting base portion;
   determining a longitudinal dimension for said gate fingers;
   securing said gate fingers to said base portion such that said gate fingers cooperate to receive the predetermined number of objects upon said gate to ultimately allow the objects to be lowered from and elevated to the bed portion of the vehicle; and
   separating adjacently disposed gate fingers sufficiently to allow a person to be positioned between respective adjacently disposed gate fingers to allow the person to stand adjacent to the bed portion of the vehicle to dispose an object upon and remove an object from the bed portion of the vehicle when said gate fingers are disposed substantially parallel to the bed portion.

2. The method of claim 1, wherein at least one of the plurality of gate fingers is extendible.

3. The method of claim 2 wherein said step of determining a longitudinal dimension for said gate fingers includes an additional step of slidably disposing an extension finger member upon a selected gate finger, then securing said extension finger member upon any one of said gate fingers via finger bolts inserted through a selected one of multiple recesses in said extension finger member aligned with a selected one of several recesses in said gate fingers.

4. The method of claim 1 wherein said step of securing said gate fingers to said base portion such that said gate fingers cooperate to receive the predetermined number of objects upon said gate, includes an additional step of detachably securing each gate finger to a preselected portion of said base portion of said vehicle gate.

5. The method of claim 4 wherein said step of detachably securing each gate finger to a preselected portion of said base portion includes an additional step of providing a groove with retaining walls in a longitudinal edge portion of said base portion that slidably captures a retaining portion of said gate finger, thereby allowing said retaining portion to longitudinally slide within said groove until being locked at a predetermined position via a restraining bolt inserted through one of a plurality of apertures in said edge portion of said base portion.

6. The method of claim 1 wherein said step of separating adjacently disposed gate fingers sufficiently to allow a person to be positioned between respective adjacently disposed gate fingers, includes an additional step of determining the space required between adjacent gate fingers to allow the person to stand between said adjacent gate fingers and forcibly urge an object from said adjacent gate fingers that the object is disposed upon and unto the bed portion aligned with said base portion and said adjacent gate fingers.

* * * * *